United States Patent
Kobayashi et al.

(10) Patent No.: US 12,545,428 B2
(45) Date of Patent: Feb. 10, 2026

(54) ELECTRIC PROPULSION SYSTEM CONTROL DEVICE

(71) Applicant: JAPAN AEROSPACE EXPLORATION AGENCY, Tokyo (JP)

(72) Inventors: Hiroshi Kobayashi, Tokyo (JP); Kentaro Yokota, Tokyo (JP); Akira Nishizawa, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 92 days.

(21) Appl. No.: 18/257,740

(22) PCT Filed: Jan. 24, 2022

(86) PCT No.: PCT/JP2022/002361
§ 371 (c)(1),
(2) Date: Jun. 15, 2023

(87) PCT Pub. No.: WO2022/181150
PCT Pub. Date: Sep. 1, 2022

(65) Prior Publication Data
US 2024/0116646 A1    Apr. 11, 2024

(30) Foreign Application Priority Data
Feb. 26, 2021   (JP) ................................ 2021-029444

(51) Int. Cl.
*B64D 45/00* (2006.01)
*B64C 17/00* (2006.01)
(Continued)

(52) U.S. Cl.
CPC .............. *B64D 45/00* (2013.01); *B64C 17/00* (2013.01); *B64C 27/52* (2013.01); *B64D 27/02* (2013.01);
(Continued)

(58) Field of Classification Search
CPC ........ B64D 31/00; B64D 31/16; B64D 31/18; B64D 27/02; B64D 27/24; B64D 27/35;
(Continued)

(56) References Cited

U.S. PATENT DOCUMENTS

| | | |
|---|---|---|
| 6,986,688 B1 | 1/2006 | Jansen |
| 9,180,976 B2 | 11/2015 | Kobayashi et al. |

(Continued)

FOREIGN PATENT DOCUMENTS

| | | |
|---|---|---|
| JP | 2006-306254 A | 11/2006 |
| JP | 2012-126201 A | 7/2012 |

(Continued)

OTHER PUBLICATIONS

International Search Report dated Apr. 5, 2022 in International Application No. PCT/JP2022/002361.
(Continued)

*Primary Examiner* — Jason H Duger
(74) *Attorney, Agent, or Firm* — SALIWANCHIK, LLOYD & EISENSCHENK (57) ABSTRACT

[Object] To detect airspeed and an airflow direction with respect to an airframe of a motorized aircraft with high accuracy without increasing the cost and weight and rapidly control attitudes of an electric propulsion system and the airframe in accordance with fluctuations of the airspeed and airflow direction.

[Solving Means] An electric propulsion system control device includes: a first airspeed measurement unit that is mounted on an airframe of an aircraft and includes a first propulsion system parameter detector that detects a propulsion system parameter, the propulsion system parameter being a parameter of an electric propulsion system, the electric propulsion system being driven by an electric motor and rotating about a rotation axis as a center, and a first
(Continued)

airspeed calculator that calculates first airspeed on a basis of the propulsion system parameter, the first airspeed being airspeed with respect to a first direction that is a direction of the rotation axis; a second airspeed measurement unit that is mounted on the airframe and measures second airspeed, the second airspeed being airspeed with respect to a second direction different from the first direction; and an airflow calculator that calculates airspeed and airflow direction with respect to the airframe on a basis of the first direction and the first airspeed and the second direction and the second airspeed.

6 Claims, 7 Drawing Sheets

(51) Int. Cl.
| | |
|---|---|
| *B64C 27/52* | (2006.01) |
| *B64D 27/02* | (2006.01) |
| *B64D 27/24* | (2024.01) |
| *B64D 27/34* | (2024.01) |
| *B64D 27/35* | (2024.01) |
| *B64D 31/00* | (2024.01) |
| *B64D 31/16* | (2024.01) |
| *B64D 31/18* | (2024.01) |
| *G01P 5/14* | (2006.01) |
| *G01P 5/16* | (2006.01) |
| *G01P 5/165* | (2006.01) |
| *G01P 5/17* | (2006.01) |
| *G01P 5/175* | (2006.01) |
| *B64C 29/00* | (2006.01) |

(52) U.S. Cl.
CPC ............. *B64D 27/24* (2013.01); *B64D 27/34* (2024.01); *B64D 27/35* (2024.01); *B64D 31/00* (2013.01); *B64D 31/16* (2024.01); *B64D 31/18* (2024.01); *G01P 5/14* (2013.01); *G01P 5/16* (2013.01); *G01P 5/165* (2013.01); *G01P 5/17* (2013.01); *G01P 5/175* (2013.01); *B64C 29/0033* (2013.01); *B64C 29/0075* (2013.01)

(58) Field of Classification Search
CPC .... B64D 27/34; B64D 45/00; B64C 29/0033; B64C 29/0075; B64C 17/00; B64C 27/26; B64C 27/28; B64C 27/52; G01P 5/14–175; G01P 5/22–26
See application file for complete search history.

(56) References Cited

U.S. PATENT DOCUMENTS

| 10,919,641 | B2* | 2/2021 | Mikic .................. G06V 40/103 |
| 2014/0116154 | A1* | 5/2014 | Seidel ..................... G01P 5/165 |
| | | | 73/861.68 |
| 2014/0257599 | A1 | 9/2014 | Kobayashi et al. |
| 2018/0127104 | A1* | 5/2018 | Kobayashi ........... B64D 27/351 |
| 2018/0237155 | A1 | 8/2018 | Ueda et al. |
| 2019/0135424 | A1 | 5/2019 | Baity et al. |
| 2019/0265732 | A1* | 8/2019 | Arwatz ................ G05D 1/0808 |

FOREIGN PATENT DOCUMENTS

| JP | 2014-172435 | A | 9/2014 |
| JP | 6112711 | B2 | 4/2017 |
| JP | 2017-83318 | A | 5/2017 |
| JP | 2020-125017 | A | 8/2020 |
| JP | 2020-183210 | A | 11/2020 |
| JP | 2021-501722 | A | 1/2021 |

OTHER PUBLICATIONS

Office Action dated May 14, 2024 in Japanese Application No. 2021-029444.

* cited by examiner

ELECTRIC PROPULSION SYSTEM CONTROL DEVICE

CROSS-REFERENCE TO RELATED APPLICATIONS

This application is the U.S. national stage application of International Patent Application No. PCT/JP2022/002361, filed Jan. 24, 2022, which claims the benefit under 35 U.S.C. § 119 of Japanese Application No. 2021-029444, filed Feb. 26, 2021, the disclosures of each of which are incorporated herein by reference in their entirety.

TECHNICAL FIELD

The present disclosure relates to an electric propulsion system control device, which is mounted on an airframe of a motorized aircraft and controls an electric propulsion system driven by an electric motor (i.e., an electric propulsion system including propellers or fans).

BACKGROUND ART

Airspeed and air density in flight are ones of the most important parameters to be monitored for allowing an aircraft to fly properly. In order to detect airspeed, the aircraft typically uses a pressure gauge connected to a pitot tube through piping for detecting pressure proportional to the second power of the airspeed. The aircraft can also use a highly-responsive airspeed detecting means such as a hot-wire velocimeter. However, mounting such a means on the aircraft causes inevitable disadvantages in terms of cost, weight, etc.

CITATION LIST

Patent Literature

Patent Literature 1: U.S. Pat. No. 6,986,688
Patent Literature 2: Japanese Patent No. 6112711

DISCLOSURE OF INVENTION

Technical Problem

Although it pertains to watercraft, Patent Literature 1 has proposed a method of detecting fluid velocity at low cost with no overweight, using propeller torque and number of revolutions estimated based on motor current for driving a propulsion propeller and a data set on fluid velocity.

According to Patent Literature 2, an air density detecting means uses a combination of a plurality of number of revolutions and torque. However, both of Patent Literatures 1 and 2 have proposed detecting means assuming that an inflow direction of the fluid is known, and they have not detected airspeed vectors (i.e., airspeed and airflow directions) of horizontal and vertical winds, for example.

Moreover, the aircraft needs to adjust operational conditions of propulsion systems, such as number of revolutions and propeller pitch angle, in accordance with an airspeed vector in order to keep the efficiency of the propulsion system and the attitude and altitude of the airframe. In particular, an aircraft with a vertical take-off and landing (VTOL) function has a safety risk of taking an incorrect attitude due to a horizontal or vertical wind especially during the landing phase where the aircraft reduces advance velocity. Therefore, that aircraft needs to adjust the tilt angles of the wings and the like so as to generate control power depending on the airspeed vector for flying. There is, however, a problem in that mounting a detecting means for rapidly coping with a change in airspeed vector and a means for generating aerodynamic force required for control may cause disadvantages in terms of weight and cost.

In view of the above-mentioned circumstances, it is an object of the present disclosure to detect airspeed and an airflow direction with respect to an airframe of a motorized aircraft with high accuracy without increasing the cost and weight and rapidly control attitudes of an electric propulsion system and the airframe in accordance with fluctuations of the airspeed and airflow direction.

Solution to Problem

An electric propulsion system control device according to an embodiment of the present disclosure includes:
  a first airspeed measurement unit that is mounted on an airframe of an aircraft and includes
    a first propulsion system parameter detector that detects a propulsion system parameter, the propulsion system parameter being a parameter of an electric propulsion system, the electric propulsion system being driven by an electric motor and rotating about a rotation axis as a center, and
    a first airspeed calculator that calculates first airspeed on the basis of the propulsion system parameter, the first airspeed being airspeed with respect to a first direction that is a direction of the rotation axis;
  a second airspeed measurement unit that is mounted on the airframe and measures second airspeed, the second airspeed being airspeed with respect to a second direction different from the first direction; and
  an airflow calculator that calculates airspeed and airflow direction with respect to the airframe on the basis of the first direction and the first airspeed and the second direction and the second airspeed.

According to the present embodiment, the airspeed and airflow direction of the airflow acting on the aircraft are calculated based on airspeed in two different directions and an airflow direction, which are measured by the first airspeed measurement unit and the second airspeed measurement unit. Accordingly, lift and drag depending on the airspeed and airflow direction and thrust needed to change depending on the lift and drag can be kept at appropriate values by rapidly detecting a change in airspeed and airflow direction in the present embodiment. This can keep the flight safely and efficiently.

The first airspeed calculator may calculate the first airspeed on the basis of a relational expression, data set, or mathematical model, the relational expression, data set, or mathematical model regarding variables indicating a relationship between the propulsion system parameter and the first airspeed.

This enables an electric means to calculate the airspeed and airflow direction. Therefore, influences on weight and cost are reduced while enhancing the detection accuracy and responsiveness.

The electric propulsion system may be capable of changing an orientation of the rotation axis, and
  the airflow calculator may calculate the airspeed and airflow direction on the basis of the propulsion system parameter at a point of time when the orientation of the rotation axis has been changed.

Changing the orientation of the rotation axis can change an angle of attack, thrust generated by the electric propulsion system, and lift generated by interaction with wings, which can change the aircraft stability. In this case, the attitude and the like of the aircraft can be controlled.

The airflow calculator may correct the airspeed and airflow direction by sequential estimation processing using the propulsion system parameters, which are detected by the first propulsion system parameter detector at a plurality of points of time, and the mathematical model.

This allows more correct calculation of the airspeed and airflow direction. Moreover, an electric means can calculate them. Therefore, influences on weight and cost are reduced while enhancing the detection accuracy and responsiveness.

The second airspeed measurement unit may measure the second airspeed on the basis of pressure on a pitot tube, the pitot tube having a tube axis direction in the second direction or having holes opened in a plurality of directions including the second direction.

The aircraft detects airspeed typically by detecting pressure proportional to the second power of the airspeed through the pressure gauge connected to the pitot tube through piping. With this method, there can be a delay of about a few seconds at most until a pressure fluctuation at an end of the pitot tube propagates through the piping and reaches the pressure gauge for detecting it as a change in airspeed. In this regard, according to the present embodiment, the second airspeed measurement unit that calculates airspeed by the use of the pitot tube and the first airspeed measurement unit that calculates airspeed on the basis of the propulsion system parameter are both used. Accordingly, calculating airspeed on the basis of the propulsion system parameter can rapidly calculate a change in airspeed, though using only the pitot tube in a case where the airspeed changes over time has caused a problem.

The second airspeed measurement unit may include
  a second propulsion system parameter detector that is driven by another electric motor and detects a propulsion system parameter, the propulsion system parameter being a parameter of another electric propulsion system that rotates about a rotation axis as a center, the rotation axis extending in the second direction, and
  a second airspeed calculator that calculates the second airspeed on the basis of the propulsion system parameter.

In the present embodiment, the airspeed and airflow direction can be calculated more rapidly because no pitot tube is used. In addition, since the sampling timing can be synchronized easily and correctly, the airspeed and airflow direction acting on the aircraft and the airflow direction can be calculated more rapidly and correctly. Additionally, since both of the first airspeed measurement unit and the second airspeed measurement unit calculate airspeed by an electric means on the basis of the propulsion system parameters, they can rapidly detect horizontal and vertical winds without cost and weight disadvantages.

The electric propulsion system control device may further include
  a third airspeed measurement unit that is mounted on the airframe and includes
    a third propulsion system parameter detector that detects a propulsion system parameter, the propulsion system parameter being a parameter of another electric propulsion system, the other electric propulsion system being driven by another electric motor and rotating about a rotation axis as a center, the rotation axis extending in a third direction different from the first direction and the second direction, and
    a third airspeed calculator that calculates a third airspeed on the basis of the propulsion system parameter, the third airspeed being airspeed with respect to a rotation axis direction, the rotation axis direction being a direction of the rotation axis, in which
  the airflow calculator may calculate the airspeed and airflow direction including three-dimensional components on the basis of the first direction and the first airspeed, the second direction and the second airspeed, and the third direction and the third airspeed.

According to the present embodiment, an electric means can calculate the airspeed and airflow direction including three-dimensional components. Accordingly, it can more correctly calculate the airspeed and airflow direction with respect to the airframe. Moreover, it can rapidly detect horizontal and vertical winds without cost and weight disadvantages.

The aircraft may include one or more electric propulsion systems, the one or more electric propulsion systems being mounted on the airframe and being respectively driven by one or more electric motors. The electric propulsion system control device may further include
  a control unit that
    calculates changes in variables regarding the propulsion system parameter and/or the airspeed and airflow direction on the basis of the propulsion system parameter, the airspeed and airflow direction, a relational expression, data set, or mathematical model, the relational expression, data set, or mathematical model regarding variables regarding aerodynamic force generated on the airframe, and
    controls total thrust of the one or more electric propulsion systems or the aerodynamic force generated on the airframe on the basis of the calculated changes in variables.

According to the present embodiment, information on the obtained airspeed and airflow direction is fed back for the thrust or output instruction of the highly-responsive electric propulsion system. Accordingly, even when the aircraft receives a horizontal wind, left and right electric propulsion systems can rapidly achieve a thrust or lift distribution depending on the airspeed and airflow direction, and can sufficiently reduce changes in attitude and path due to the horizontal wind.

The aircraft may be mounted on the airframe and includes one or more electric propulsion systems respectively driven by the one or more electric motors. The electric propulsion system control device may further include
  a control unit that
    calculates changes in variables regarding the propulsion system parameter and/or the airspeed and airflow direction on the basis of the propulsion system parameter, the airspeed and airflow direction, a relational expression, data set, or mathematical model, the relational expression, data set, or mathematical model regarding variables regarding aerodynamic force generated on the airframe, and
    controls an attitude or flight path of the aircraft on the basis of the calculated changes in variables.

According to the present embodiment, rapidly detecting a change in airspeed and airflow direction can keep lift and drag depending on the airspeed and airflow direction and thrust needed to change depending on the lift and the drag at appropriate values. This can keep the flight safely and efficiently.

The electric propulsion system may include a propeller or fan.

The present embodiment can be applied to any motorized aircraft with an electric propulsion system driven by an electric motor, such as a motorized aircraft with a vertical take-off and landing (VTOL) function and a motorized aircraft without the VTOL function.

Advantageous Effects of Invention

According to the present disclosure, the airspeed and airflow direction with respect to the airframe of the motorized aircraft are detected with high accuracy without increasing the cost and weight and the attitudes of the electric propulsion system and the airframe are rapidly controlled in accordance with fluctuations of the airspeed and airflow direction.

It should be noted that the effects described here are not necessarily limitative and any effect described in the present disclosure may be provided.

MODE(S) FOR CARRYING OUT THE INVENTION

Hereinafter, embodiments of the present disclosure will be described with reference to the drawings.

I. First Embodiment

1. Concepts of Present Embodiment

Figure 1:
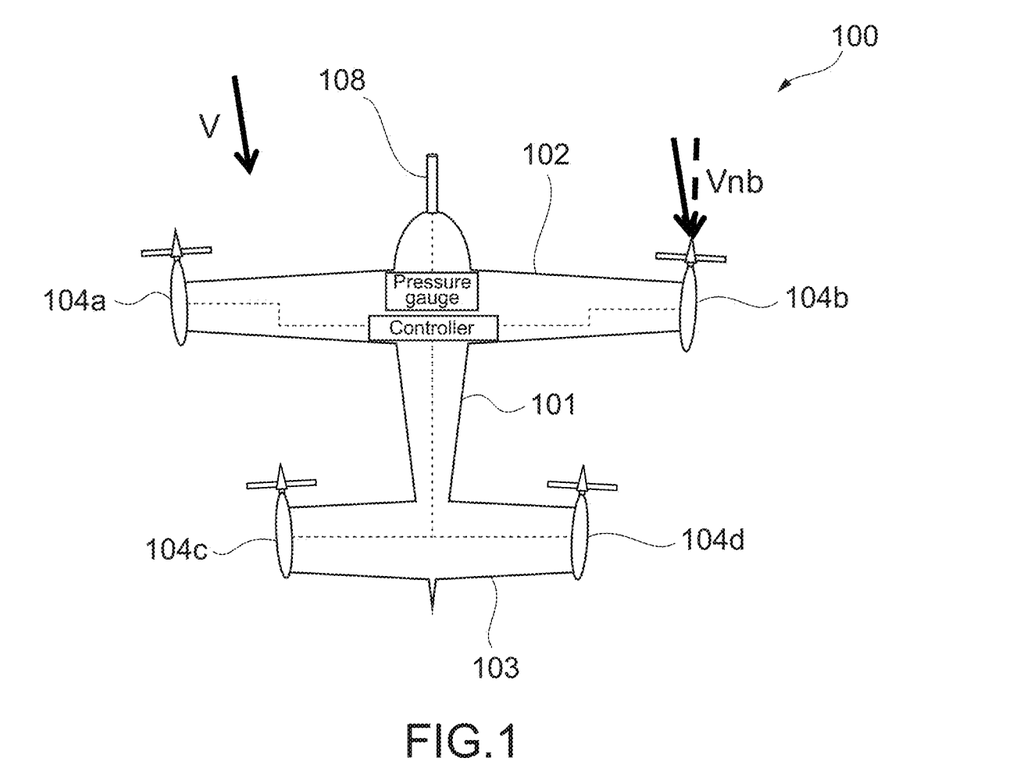
FIG. 1 A diagram schematically showing an example of a motorized aircraft according to a first embodiment of the present disclosure.

FIG. 1 schematically shows an example of a motorized aircraft according to a first embodiment of the present disclosure.

A motorized aircraft 100 according to the present embodiment is an aircraft with a vertical take-off and landing (VTOL) function. Alternatively, the present embodiment may be applied to a motorized aircraft without the VTOL function. That is, the present embodiment can be applied to any motorized aircraft with an electric propulsion system driven by an electric motor.

The motorized aircraft 100 includes main wings 102, 103 with tilt mechanisms at front and rear portions of the airframe 101. Electric propulsion systems 104a, 104b are mounted on both ends of the front main wing 102. Electric propulsion systems 104c, 104d are mounted on both ends of the rear main wing 103. The electric propulsion systems 104a, 104b, 104c, 104d each have a propeller or fan (propeller in the present embodiment (hereinafter, the same applies)). The propeller is driven by the electric motor and rotates about a rotation axis as a center. The motorized aircraft 100 has a pitot tube 108 for measuring airspeed. The motorized aircraft 100 is capable of vertical landing by tilting the main wings 102, 103. Tilting the main wings 102, 103 changes orientations of rotation axes of the electric propulsion systems 104a, 104b, 104c, 104d. The motorized aircraft 100 in this example has the plurality of electric propulsion systems 104a, 104b, 104c, 104d. Alternatively, the present embodiment may be applied to a motorized aircraft (not shown) with a single electric propulsion system.

Figure 2:
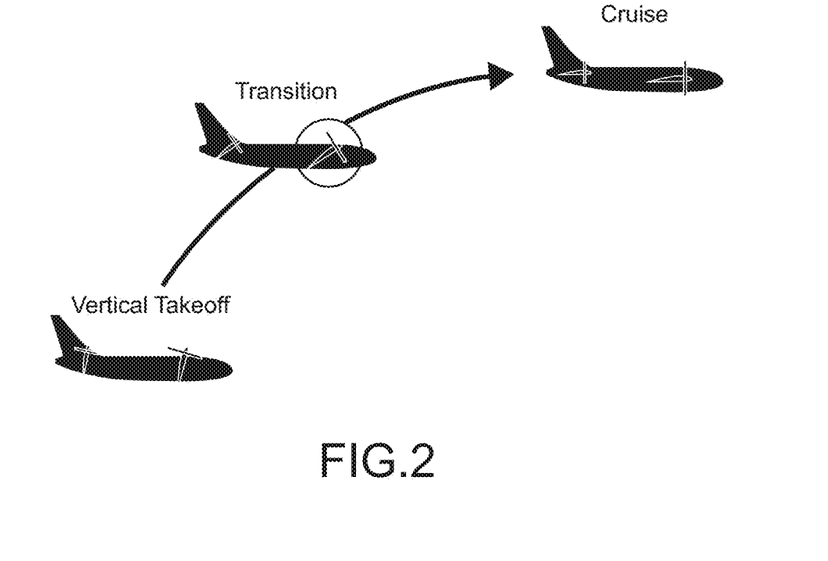
FIG. 2 A diagram schematically showing transition from vertical take-off to cruise of the motorized aircraft.

FIG. 2 schematically shows transition from vertical take-off to cruise of the motorized aircraft.

During the vertical take-off, the motorized aircraft 100 tilts each main wing 102, 103 and orients the propeller rotation axis upward near the vertical line. During the transition, the motorized aircraft 100 changes propeller rotation axes and angles of attack α of the main wings 102, 103 into appropriate angles for cruise.

Figure 3:
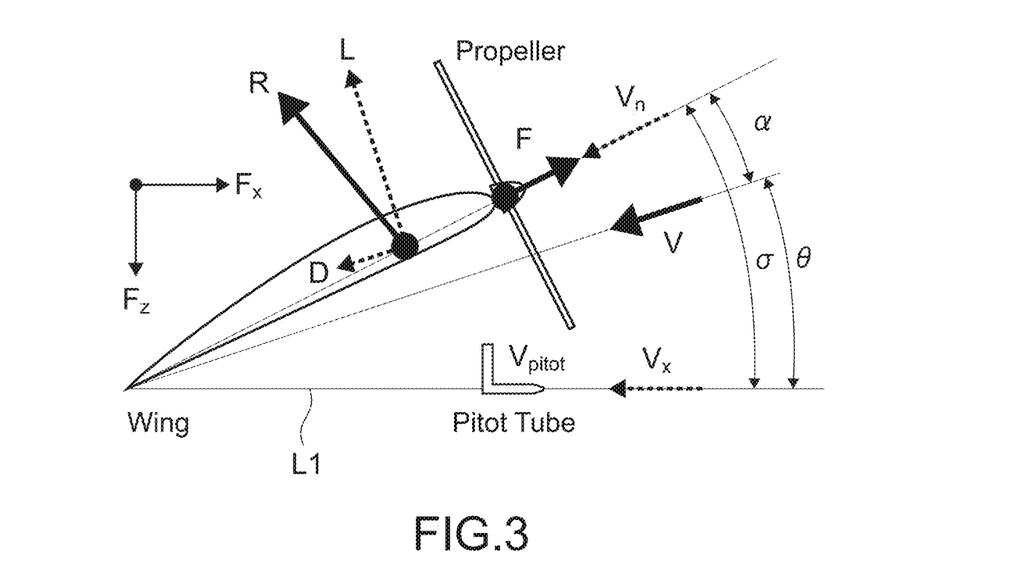
FIG. 3 A diagram schematically showing an airflow with respect to an airframe during the transition from vertical take-off to cruise of the motorized aircraft.

FIG. 3 schematically shows an airflow with respect to the airframe during the transition from vertical take-off to cruise of the motorized aircraft.

An airspeed vector V acts on the airframe from the front along with the movement of the airframe especially during the transition. An airflow increased in speed by the propeller can additionally act on a part of the main wing. As a result, lift L and drag D are generated on the airframe. Balancing thrust F and gravity Fz generated by the respective electric propulsion systems as well as the lift L and the drag D acting on the aircraft makes the aircraft fly stably.

In general, airspeed acting on the aircraft in a predetermined direction such as a tube axis direction of the pitot tube or a rotation axis direction of the propeller during the flight can be calculated. However, an airflow direction of an airflow acting on the aircraft, e.g., a horizontal or vertical wind, has not been calculated. In other words, the airspeed vector directly acting on the aircraft (i.e., airspeed and airflow direction (hereinafter, the same applies)) has not been calculated. Therefore, in general, the aircraft is controlled to reduce shaking only after an airflow change shakes the aircraft, for example.

In this regard, concepts of the present embodiment include calculating the airspeed vector V (i.e., airspeed and airflow direction) of the airflow acting on the aircraft and controlling the aircraft and the electric propulsion system on the basis of the calculated airspeed vector V. Then, rapidly detecting a change in airspeed vector V can keep the lift L and drag D depending on the airspeed vector V and the thrust F needed to change depending on the lift L and the drag D at appropriate values in the present embodiment. This can keep the flight safely and efficiently.

In the present embodiment, airspeed with respect to a known first direction (referred to as first airspeed (hereinafter, the same applies)) and airspeed with respect to a known second direction different from the first direction (referred to as second airspeed (hereinafter, the same applies)) are calculated. The known first and second directions are determined in advance. They are expressed as predetermined angles with respect to a datum line L1 of the airframe (e.g., aircraft axis). In the example shown in FIG. 3, the first direction is a propeller rotation axis direction and an angle with respect to a datum line L1 is a tilt angle σ. The second direction is a tube axis direction of the pitot tube and corresponds to the angle of the datum line L1. A first airspeed vector Vn indicating the first airspeed with respect to the first direction (propeller rotation axis direction) and a second airspeed vector Vx indicating the second airspeed with respect to the second direction (tube axis direction of the pitot tube) are calculated. The first airspeed vector Vn and the second airspeed vector Vx are combined. The airspeed vector V acting on the aircraft is thus calculated. In other words, the airflow direction of the airflow acting on the aircraft (i.e., the angle θ with respect to the datum line L1) and the airspeed (i.e., the magnitude of the airspeed vector V) can be calculated.

The angle of attack α of the main wing can be calculated by subtracting the angle θ of the airspeed vector V from the tilt angle σ. The lift L and the drag D can be calculated based on the airspeed vector V and the angle of attack α of the main wing. This can keep the thrust F needed to change depending on the lift L and the drag D at appropriate values. This can keep the flight safely and efficiently.

2. Hardware Configuration of Electric Propulsion System of Motorized Aircraft

Figure 4:
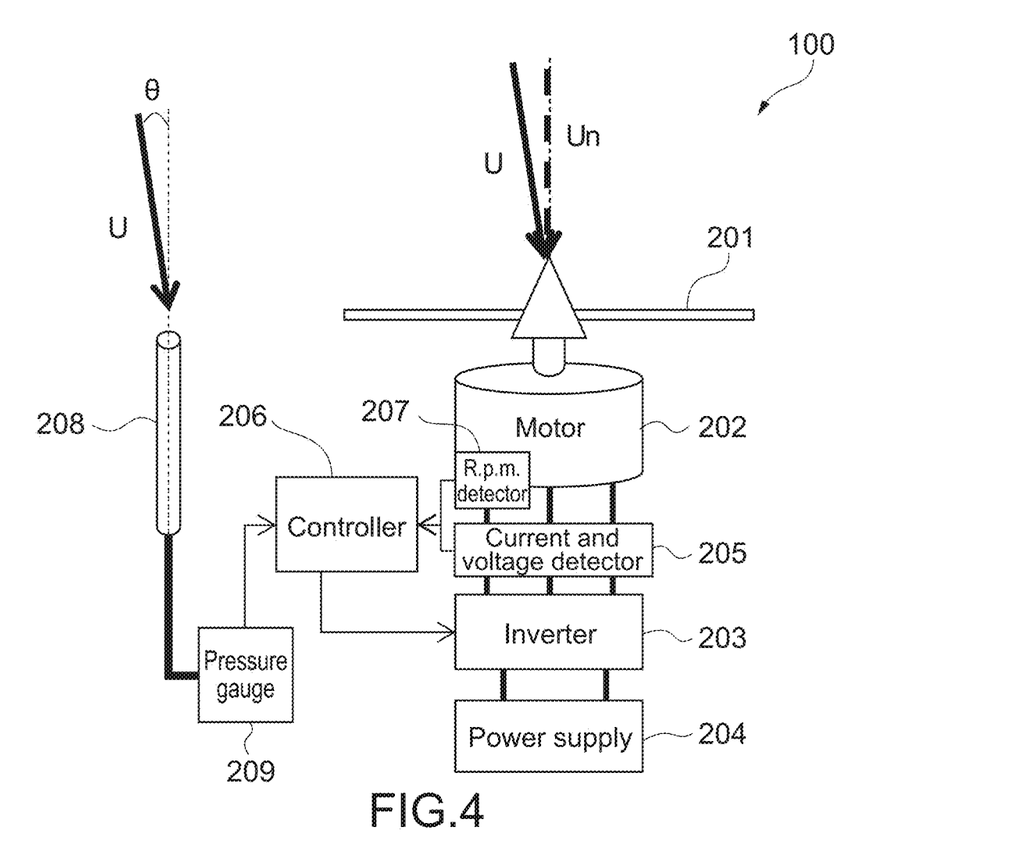
FIG. 4 A diagram showing a hardware configuration of an electric propulsion system of the motorized aircraft.

FIG. 4 shows a hardware configuration of an electric propulsion system of the motorized aircraft.

The motorized aircraft 100 includes a propeller 201, a motor 202, an inverter 203, a power supply 204, a current and voltage detector 205, a controller 206, an number of revolutions detector 207, a velocity detector 208, and a pressure gauge 209. The propeller 201, the motor 202, the inverter 203, the power supply 204, and the current and voltage detector 205 constitute an electric propulsion system 250 in FIG. 5. The electric propulsion system 250 corresponds to any one of the electric propulsion systems 104a, 104b, 104c, 104d in FIG. 1.

The propeller 201 rotates about a rotation axis as a center at predetermined number of revolutions by the inverter 203 controlling the number of revolutions of the motor 202 and the motor 202 driving the propeller 201. The current and voltage detector 205 detects current I supplied to the motor 202. The number of revolutions detector 207 detects propeller number of revolutions N.

The velocity detector 208 is a pitot tube. The velocity detector 208 receives stagnation pressure and static pressure from an airflow. The pressure gauge 209 measures an airflow pressure (dynamic pressure) by subtracting the static pressure from the stagnation pressure and calculates airspeed on the basis of the pressure. In a case where the velocity detector 208 is a pitot tube with a single hole, the pressure gauge 209 determines airspeed in a tube axis direction (second direction) of the pitot tube. The velocity detector 208 may be a pitot tube having a plurality of holes, e.g., three or five holes opened in a plurality of directions including a direction (second direction) of an airflow to be measured. In a case where the velocity detector 208 is a pitot tube having a plurality of holes, the pressure gauge 209 determines airspeed of an opening direction (second direction) of one of the holes. The direction (second direction) of an airflow measured by the pitot tube is different from the rotation axis direction (first direction) of the propeller 201. It should be noted that in the present embodiment, the velocity detector 208 is a pitot tube having a single hole and the pressure gauge 209 determines airspeed in a tube axis direction (second direction) of the pitot tube.

The controller 206 calculates an aircraft velocity vector V of the motorized aircraft 100 with respect to the airflow on the basis of the current I supplied to the motor 202, the propeller number of revolutions N, and the airspeed in the tube axis direction of the pitot tube. The airspeed vector V includes the angle θ of the airspeed vector (i.e., airflow direction) with respect to the datum line and the magnitude U of the airspeed vector (i.e., airspeed). The controller 206 controls the motorized aircraft 100 on the basis of the calculated airspeed vector V. Hereinafter, functions of the controller 206 will be described in more detail.

3. Configuration of Electric Propulsion System Control Device

Figure 5:
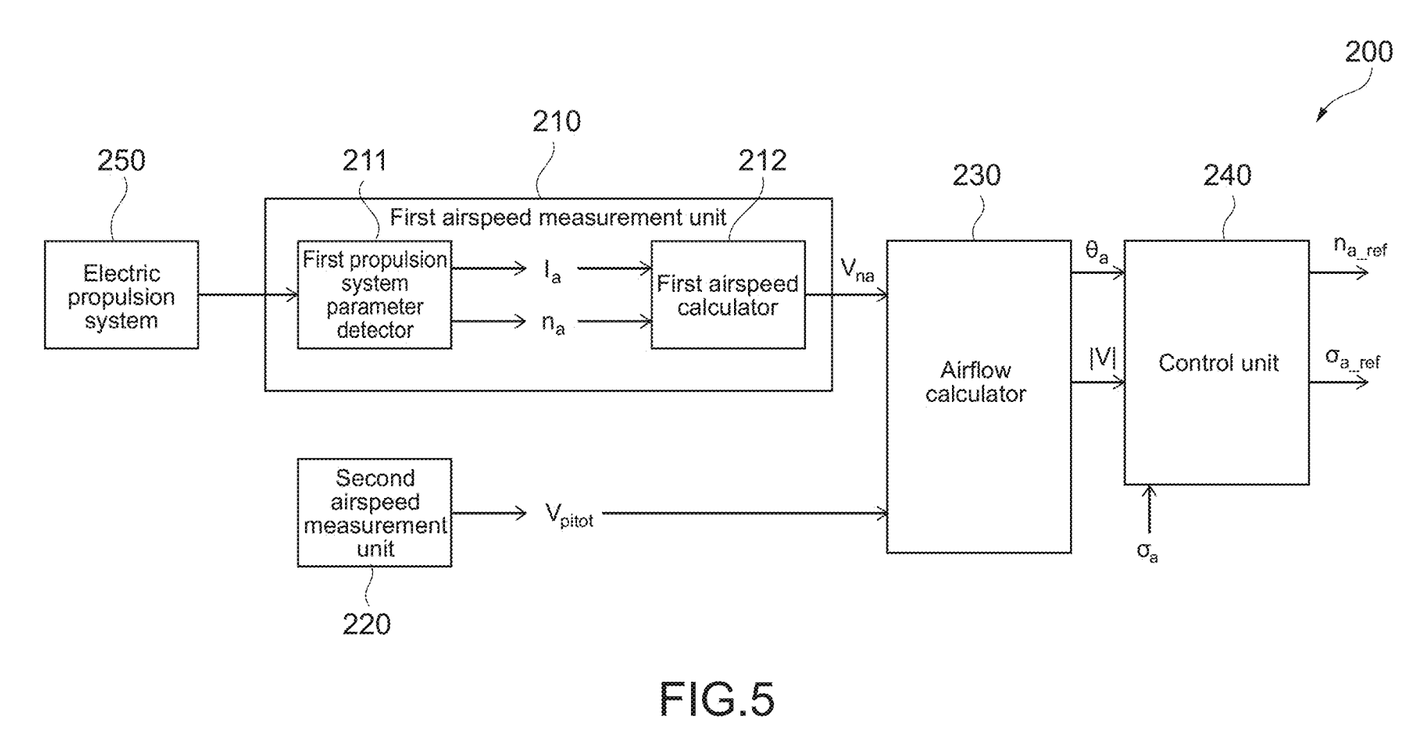
FIG. 5 A diagram showing a configuration of an electric propulsion system control device.

FIG. 5 shows a configuration of the electric propulsion system control device.

An electric propulsion system control device 200 is mounted on the motorized aircraft 100. The controller 206 in FIG. 4 and/or dedicated electric circuitry realizes the electric propulsion system control device 200. The electric propulsion system control device 200 controls the electric propulsion system 250. The electric propulsion system 250 includes the propeller 201, the motor 202, the inverter 203, and the power supply 204 in FIG. 4. The electric propulsion system control device 200 includes a first airspeed measurement unit 210, a second airspeed measurement unit 220, an airflow calculator 230, and a control unit 240.

The first airspeed measurement unit 210 includes a first propulsion system parameter detector 211 and a first airspeed calculator 212.

The first propulsion system parameter detector 211 detects a parameter (referred to as the propulsion system parameter) of the electric propulsion system 250. The first propulsion system parameter detector 211 includes the current and voltage detector 205 and the number of revolutions detector 207 in FIG. 4. Specifically, the first propulsion system parameter detector 211 detects current Ia supplied to the motor 202 and propeller number of revolutions na of the propeller 201. The current Ia and the propeller number of revolutions na are propulsion system parameters.

The first airspeed calculator 212 acquires the current Ia and the propeller number of revolutions na as the propulsion system parameters. The first airspeed calculator 212 stores a relational expression, data set, or mathematical model for example regarding variables indicating a relationship between the current I supplied to the motor 202 and the propeller number of revolutions N (i.e., propulsion system parameters) and airspeed Un with respect to the propeller rotation axis direction.

Figure 6:
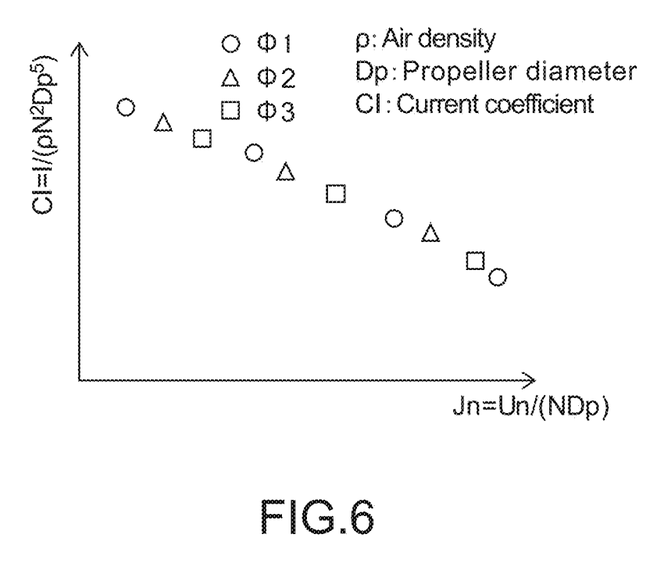
FIG. 6 A diagram showing an example of a data set for calculating airspeed on the basis of current and propeller number of revolutions FIG. 7 A diagram showing an example of a data set for calculating airspeed on the basis of pressure and an angle with respect to a datum line for a tube axis direction of a pitot tube.

FIG. 6 shows an example of a data set for calculating airspeed on the basis of the current and the propeller number of revolutions FIG. 6 is an example of a data set indicating a relationship between an advance ratio Jn and a current coefficient CI when the aircraft flies at a certain airspeed, assuming that the angle of the propeller rotation axis with respect to the datum line is denoted by a plurality of variations Φ1, Φ2, and Φ3. The advance ratio Jn is calculated in accordance with $Jn=Un/(NDp)$, i.e., "advance ratio=magnitude of airspeed component in rotation axis direction/(propeller number of revolutions×propeller diameter)". The current coefficient CI is calculated in accordance with $CI=I/(\rho N^2 Dp^5)$, i.e., "current coefficient=current/(air density×propeller number of revolutions$^2$×propeller diameter$^5$)". The current coefficient CI and the advance ratio Jn have a correlation irrespective of the variations Φ1, Φ2, Φ3 in angle of the propeller rotation axis. Therefore, if the current I and the propeller number of revolutions$^N$ and also the propeller diameter Dp and the air density ρ are known, the current coefficient CI can be calculated based on the current I and the propeller number of revolutions$^N$ as the propulsion system parameters. Moreover, the advance ratio Jn can be calculated referring to FIG. 6 using the current coefficient CI. Furthermore, magnitude Un of the airspeed vector with respect to the rotation axis direction of the propeller can be calculated. For such calculation, an approximation expression based on the data set as shown in FIG. 6 may be generated in advance as a function and stored as a relational expression. Moreover, a mathematical model reflecting on the data set may be generated in advance and stored as a mathematical model.

Using such a relational expression, data set, or mathematical model for example, the first airspeed calculator 212 calculates first airspeed Vna with respect to the propeller rotation axis direction on the basis of the current Ia supplied to the motor 202 and the propeller number of revolutions na (i.e., propulsion system parameters).

The second airspeed measurement unit 220 includes the velocity detector 208 and the pressure gauge 209 in FIG. 4. The velocity detector 208 (pitot tube) receives stagnation pressure and static pressure from an airflow. The pressure gauge 209 measures an airflow pressure p (dynamic pressure) by subtracting the static pressure from the stagnation pressure. The second airspeed measurement unit 220 stores a relational expression, data set, or mathematical model for example regarding variables indicating a relationship between pressure p, an angle θ of the tube axis direction of the pitot tube with respect to the datum line, and magnitude U1, U2, U3 of the airspeed vector in the tube axis direction of the pitot tube.

Figure 7:
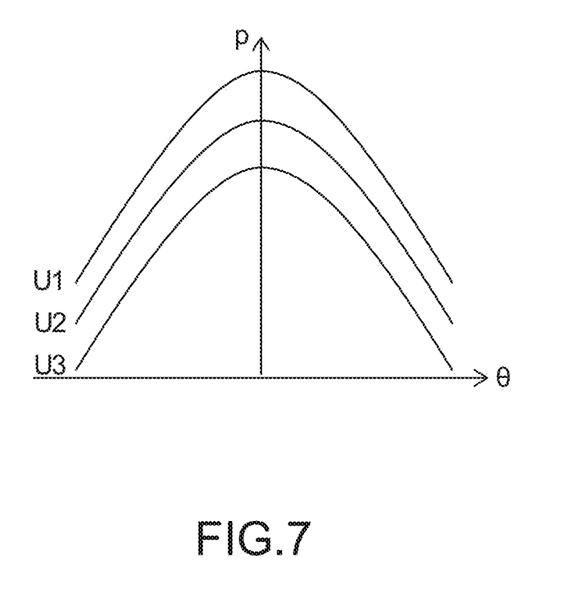

FIG. 7 shows an example of a data set for calculating airspeed on the basis of the pressure and the angle of the tube axis direction of the pitot tube with respect to the datum line.

FIG. 7 is an example of a data set indicating a relationship between the pressure p, the angle θ of the tube axis direction of the pitot tube with respect to the datum line, and the magnitude U1, U2, U3 of the airspeed vector. If the relationship between the pressure p, the angle θ of the pitot tube, and the magnitude U of the airspeed vector is modeled as, for example, $p=appU^2-a\theta^m$ (ap, aθ, m are constants), U and θ can be calculated by using simultaneous equations of Un(=U cos Φ) and θ=Φ−σ calculated in accordance with the above-mentioned method.

Using such a relational expression, data set, or mathematical model for example, the second airspeed measurement unit 220 calculates airspeed Vpitot of the aircraft with respect to the tube axis direction of the pitot tube on the basis of the pressure p measured by the pressure gauge 209 and the angle θ of the tube axis direction of the pitot tube with respect to the datum line. That is, since the pressure p is proportional to the second power of the airspeed, the airspeed Vpitot in the tube axis direction of the pitot tube is calculated by measuring the pressure p through the pitot tube. Second airspeed Vx with respect to the tube axis direction of the pitot tube in FIG. 3 equals the airspeed Vpitot of the aircraft.

As described above, the first airspeed calculator 212 calculates first airspeed Vna with respect to the propeller rotation axis direction (first direction). The second airspeed measurement unit 220 calculates airspeed Vpitot of the aircraft with respect to the tube axis direction (second direction) of the pitot tube. The propeller rotation axis direction (first direction) is different from the tube axis direction (second direction) of the pitot tube.

The airflow calculator 230 acquires the first airspeed Vna calculated by the first airspeed calculator 212 and the second airspeed Vpitot measured by the second airspeed measurement unit 220. The airflow calculator 230 further acquires the tilt angle σ in the direction (first direction) of the propeller rotation axis and the direction (second direction) that is the tube axis direction of the pitot tube.

As shown in FIG. 3, the airflow calculator 230 combines the first airspeed vector Vn indicating the first airspeed with respect to the first direction (propeller rotation axis direction) and the second airspeed vector Vx indicating the second airspeed with respect to the second direction (tube axis direction of the pitot tube). The airflow calculator 230 thus calculates an airspeed vector V acting on the aircraft. Specifically, the airflow calculator 230 calculates airflow direction and airspeed of the airflow acting on the aircraft. In other words, the airflow calculator 230 calculates an angle θa of the airflow with respect to the datum line and magnitude |V| of the airspeed vector V.

The airflow calculator 230 may calculate the airspeed V and the airflow direction θ on the basis of the propulsion system parameters at a point of time when the orientation (i.e., tilt angle σ) of the propeller rotation axis of the electric propulsion system 250 has been changed. Changing the orientation (tilt angle σ) of the propeller rotation axis changes the lift generated by interaction between the angle of attack α, the thrust generated by the above-mentioned electric propulsion systems, and the wings, which can change the aircraft stability. It is thus necessary to control the attitude and the like of the airframe 101.

Figure 8:
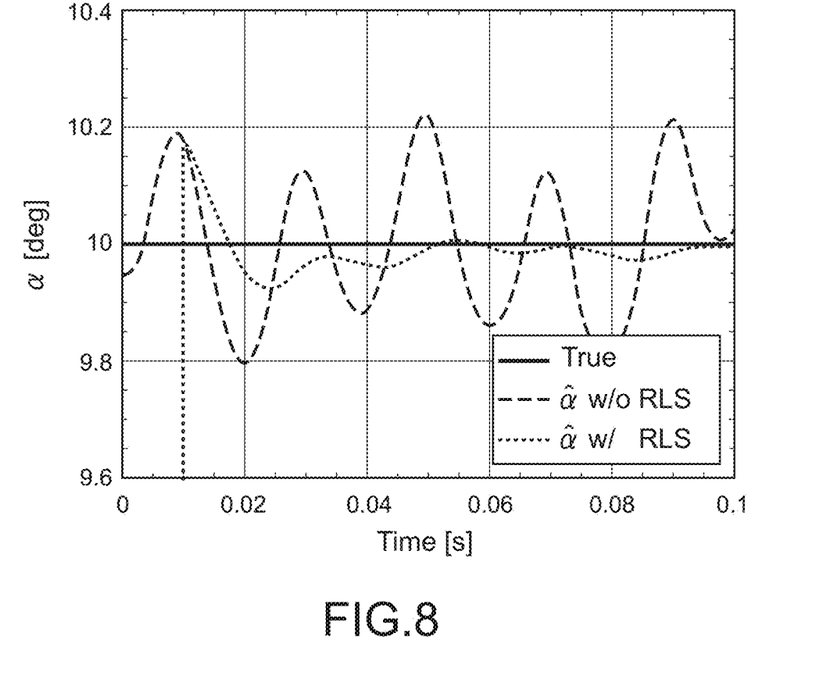
FIG. 8 A diagram showing an example of time-series data on an airflow direction corrected by sequential processing.

FIG. 8 shows an example of time-series data in the airflow direction corrected by sequential processing. As shown in FIG. 8, the airflow calculator 230 may correct the airspeed and airflow direction on the basis of the method of least squares, Kalman filter, or the like by sequential estimation processing using time-series data on propulsion system parameters detected by the first propulsion system parameter detector 211 at a plurality of points of time and the airspeed vector V and the mathematical model. In FIG. 8, "True" denotes a truth value of the angle of attack α, "α^w/oRLS" denotes an estimate of the angle of attack α not corrected by sequential processing, and "α^w/RLS" denotes an estimate of the angle of attack α subjected to sequential processing. FIG. 8 shows that the corrected estimate α^w/RLS of the angle of attack α is closer to the truth value True of the angle of attack α as a result of correcting the estimate ^w/oRLS of the angle of attack α by sequential processing.

The control unit 240 stores propulsion system parameters, airspeed and airflow direction, a relational expression, data set, or mathematical model, the relational expression, data set, or mathematical model regarding variables regarding aerodynamic force generated on the airframe, and the like. The control unit 240 calculates changes in the variables regarding the propulsion system parameters (i.e., the current Ia supplied to the motor 202 and the propeller number of revolutions na) or the airflow direction θa and the airspeed |V| on the basis of the relational expression, data set, or mathematical model for example.

The control unit 240 calculates an appropriate propeller number of revolutions na_ref of the electric propulsion system 250 and outputs it to the electric propulsion system 250. Moreover, the control unit 240 controls, on the basis of the calculated changes in variables, the operational conditions of the electric propulsion systems constituted by the highly-responsive electric motors so that the total thrust of the plurality of electric propulsion systems 104a, 104b, 104c, 104d or the aerodynamic force generated by the airframe 101 falls within a desired range.

Alternatively/additionally, the control unit 240 controls the attitude and flight path of the airframe 101 of the motorized aircraft 100 on the basis of the calculated changes in variables. For example, the control unit 240 calculates an appropriate tilt angle σa_ref and outputs it to the electric propulsion system 250 for controlling the attitude of the airframe 101.

4. Brief Summary

Figure 9:
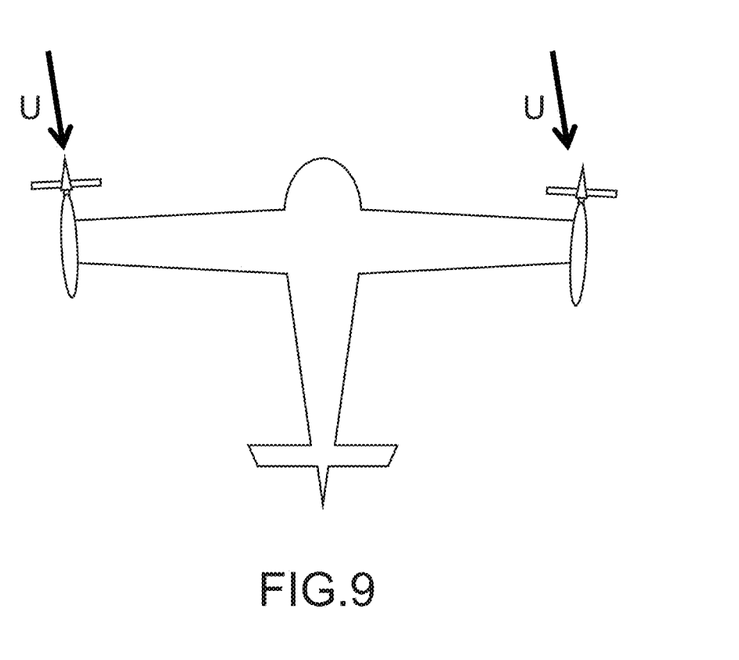
FIG. 9 A diagram schematically showing a case where the aircraft receives a horizontal wind.

According to the present embodiment, information on the obtained airspeed vector V is fed back for the thrust F or output instruction of the highly-responsive electric propulsion system 250. Accordingly, even when the aircraft receives a horizontal wind U as in FIG. 9, the left and right electric propulsion systems 250 can rapidly achieve a thrust or lift distribution depending on the airspeed vector V, and can sufficiently reduce changes in attitude and path due to the horizontal wind U.

The aircraft detects airspeed typically by detecting pressure proportional to the second power of the airspeed through the pressure gauge connected to the pitot tube through piping. With this method, there can be a delay of about a few seconds at most until a pressure fluctuation at an end of the pitot tube propagates through the piping and reaches the pressure gauge for detecting it as a change in airspeed. In this regard, according to the present embodiment, the second airspeed measurement unit 220 that calculates airspeed by the use of the pitot tube and the first airspeed measurement unit 210 that calculates airspeed on the basis of the propulsion system parameters (i.e., current and propeller number of revolutions) are both used. Accordingly, calculating airspeed on the basis of the propulsion system parameters (i.e., current and propeller number of revolutions) can rapidly calculate a change in airspeed, though using only the pitot tube in a case where the airspeed changes over time has caused a problem. Additionally, since the first airspeed measurement unit 210 calculates airspeed by an electric means on the basis of the propulsion system parameters (i.e., current and propeller number of revolutions), it can rapidly detect horizontal and vertical winds without cost and weight disadvantages.

Moreover, only the second airspeed measurement unit 220 that calculates airspeed by the use of the pitot tube or only the first airspeed measurement unit 210 that calculates airspeed on the basis of the propulsion system parameters (i.e., current and propeller number of revolutions) can calculate only airspeed acting in a predetermined direction, e.g., the tube axis direction of the pitot tube or the rotation axis direction of the propeller. In other words, it cannot calculate an airflow direction of the airflow acting on the aircraft, e.g., a horizontal or vertical wind. Therefore, in general, the aircraft is controlled to reduce shaking only after an airflow change shakes the aircraft, for example.

In this regard, according to the present embodiment, the airspeed vector V (i.e., airspeed and airflow direction) of the airflow acting on the aircraft is calculated on the basis of airspeed vectors in two different directions measured by the first airspeed measurement unit 210 and the second airspeed measurement unit 220. Accordingly, in the present embodiment, rapidly detecting a change in airspeed vector V can keep the lift L and drag D depending on the airspeed vector V and the thrust F needed to change depending on the lift L and the drag D at appropriate values. This can keep the flight safely and efficiently.

II. Second Embodiment

In each of the following embodiments, the descriptions and illustrations of configurations and functions similar to those described above will be omitted and different configurations and functions will be mainly described.

In the first embodiment, the first airspeed measurement unit 210 calculates airspeed on the basis of the propulsion system parameters (i.e., current and propeller number of revolutions). The second airspeed measurement unit 220 calculates airspeed by the use of the pitot tube.

In this regard, the second airspeed measurement unit in the second embodiment also has a configuration similar to that of the first airspeed measurement unit 210 and calculates airspeed on the basis of the propulsion system parameters in a similar manner to the first airspeed measurement unit 210. In other words, no pitot tube is used in the second embodiment.

1. Configuration of Electric Propulsion System Control Device

Figure 10:
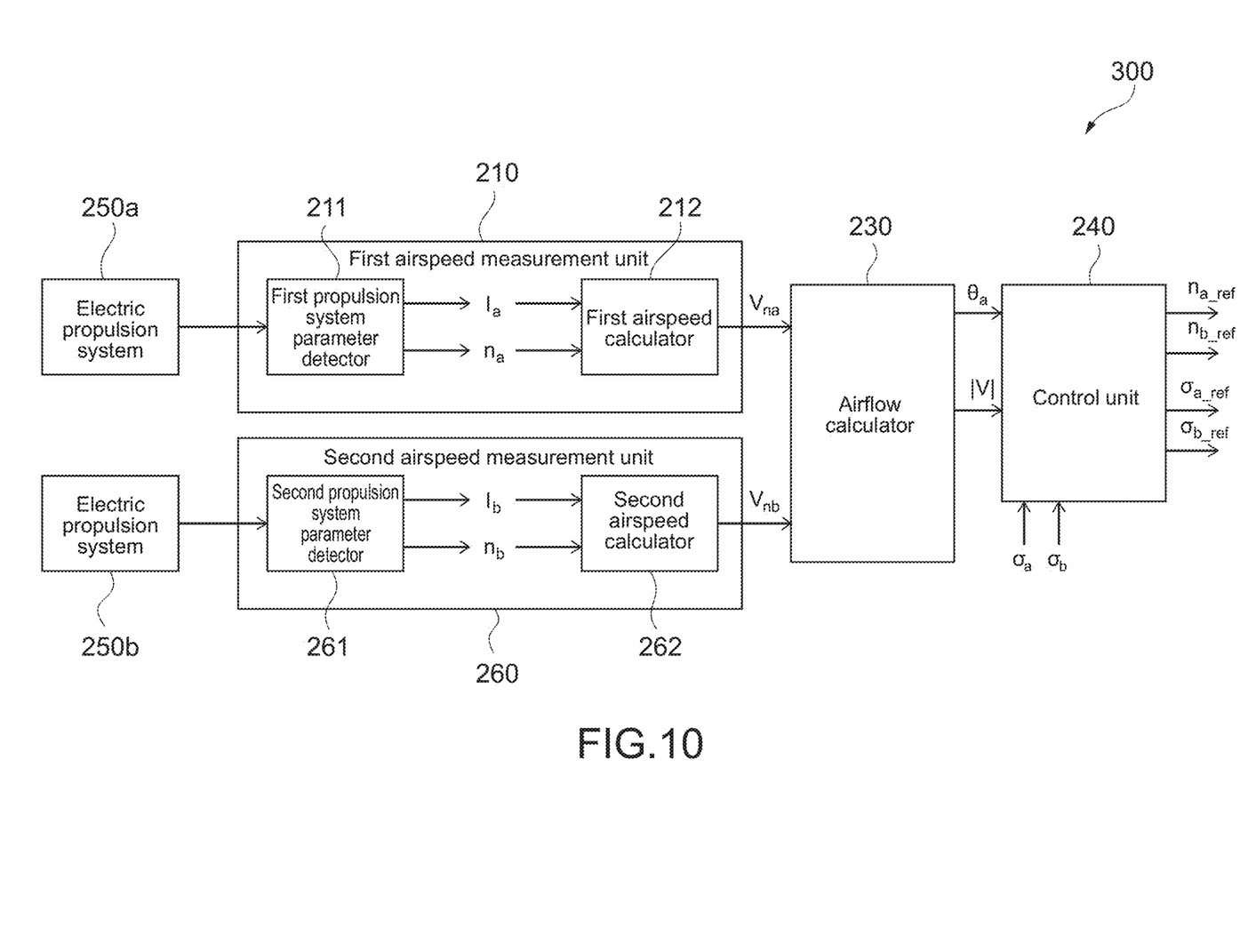
FIG. 10 A diagram showing a configuration of an electric propulsion system control device according to a second embodiment of the present invention.

FIG. 10 shows a configuration of an electric propulsion system control device according to a second embodiment of the present invention.

An electric propulsion system control device 300 is mounted on the motorized aircraft 100. The electric propulsion system control device 300 controls two electric propulsion systems 250a, 250b. The electric propulsion systems 250a, 250b each correspond to any one of the electric propulsion systems 104a, 104b, 104c, 104d (see FIG. 1). A propeller rotation axis direction (first direction) of the electric propulsion system 250a is different from a propeller rotation axis direction (second direction) of an electric propulsion system 250b.

The electric propulsion system control device 300 includes a first airspeed measurement unit 210, a second airspeed measurement unit 260, an airflow calculator 230, and a control unit 240.

The first airspeed measurement unit 210 includes a first propulsion system parameter detector 211 and a first airspeed calculator 212. The first propulsion system parameter detector 211 detects propulsion system parameters of the electric propulsion system 250a (i.e., current Ia supplied to the motor 202 and propeller number of revolutions na of the propeller 201 that are included in the electric propulsion system 250a). The first airspeed calculator 212 calculates first airspeed Vna with respect to the propeller rotation axis direction (first direction) of the electric propulsion system 250a on the basis of the propulsion system parameters (i.e., current Ia and propeller number of revolutions na) of the electric propulsion system 250a.

The second airspeed measurement unit 260 includes a second propulsion system parameter detector 261 and a second airspeed calculator 262. The second propulsion system parameter detector 261 detects propulsion system parameters of the electric propulsion system 250b (i.e., current I supplied to the motor 202b and propeller number of revolutions nb of the propeller 201 that are included in the electric propulsion system 250b). The second airspeed calculator 262 calculates second airspeed Vnb with respect to the propeller rotation axis direction (second direction) of the electric propulsion system 250b on the basis of the propulsion system parameters (i.e., current Ib and propeller number of revolutions nb) of the electric propulsion system 250b.

The airflow calculator 230 acquires the first airspeed Vna calculated by the first airspeed calculator 212 and the second airspeed Vnb measured by the second airspeed measurement unit 220. The airflow calculator 230 further acquires the direction (first direction) of the propeller rotation axis of the electric propulsion system 250a and the direction (second direction) of the propeller rotation axis of the electric propulsion system 250b.

The airflow calculator 230 combines a first airspeed vector Vna indicating the first airspeed with respect to the first direction and a second airspeed vector Vnb indicating second airspeed with respect to the second direction. The airflow calculator 230 thus calculates airspeed vector V acting on the aircraft. Specifically, the airflow calculator 230 calculates airflow direction and airspeed of the airflow acting on the aircraft. In other words, the airflow calculator 230 calculates an angle θa of the airflow with respect to the datum line and magnitude |V| of the airspeed vector V.

The airflow calculator 230 may calculate the airspeed V and the airflow direction θ on the basis of the propulsion system parameters at a point of time when the orientations (i.e., tilt angles σa, σb) of the propeller rotation axes of the electric propulsion systems 250a, 250b have been changed. Changing the orientations (tilt angles σa, σb) of the propeller rotation axes changes the lift generated by interaction between the angle of attack α, the thrust generated by the above-mentioned electric propulsion systems, and the wings, which can change the aircraft stability. It is thus necessary to control the attitude and the like of the airframe 101.

The control unit 240 calculates appropriate propeller number of revolutions na_ref, nb_ref of the electric propulsion systems 250a, 250b and outputs them to the electric propulsion systems 250a, 250b, respectively. Moreover, the control unit 240 controls the operational conditions of the electric propulsion systems constituted by the highly-responsive electric motors on the basis of the calculated changes in variables, so that the total thrust of the plurality of electric propulsion systems 104a, 104b, 104c, 104d or the aerodynamic force generated by the airframe 101 falls within a desired range.

Alternatively/additionally, the control unit 240 controls the attitude and flight path of the airframe 101 of the motorized aircraft 100 on the basis of the calculated changes in variables. For example, the control unit 240 calculates appropriate tilt angles σa_ref, σb_ref of the electric propulsion systems 250a, 250b and outputs them to the electric propulsion systems 250a, 250b for controlling the attitude of the airframe 101.

2. Brief Summary

According to the present embodiment, the main wings have the tilt mechanisms. Therefore, for example, setting different tilt angles to the front/rear and left/right main wings can set the propeller rotation axes of the plurality of electric propulsion systems 104a, 104b, 104c to have different angles from the airspeed vector. The first airspeed measurement unit 210 and the second airspeed measurement unit 260 sample the propulsion system parameters of the electric propulsion systems 250a, 250b and calculate airspeed vectors Vna, Vnb in the first direction and the second direction.

In the present embodiment, the airspeed vector can be calculated more rapidly because no pitot tube is used unlike the first embodiment. In addition, since the sampling timing can be synchronized easily and correctly, the airspeed and the airflow direction of the airspeed vector V acting on the aircraft can be calculated more rapidly and correctly. Additionally, since both of the first airspeed measurement unit 210 and the second airspeed measurement unit 260 calculate airspeed by an electric means on the basis of the propulsion system parameters (i.e., current and propeller number of revolutions), they can rapidly detect horizontal and vertical winds without cost and weight disadvantages.

The tilt angles σa, σb and a thrust or lift distribution, and thus, aerodynamic force performance (e.g., L/D=lift/drag) or the airframe, a flight path during take-off/landing for example can be kept constantly optimal in accordance with a change in airspeed vector V by feeding back information on the airspeed vector for the thrust F or output instructions of the highly-responsive electric propulsion systems 250a, 250b.

III. Third Embodiment

In the first and second embodiments, the electric propulsion system control devices 200, 300 include the first airspeed measurement unit 210 and the second airspeed measurement unit 220, 260 (i.e., the two airspeed measurement units).

In this regard, in the third embodiment, the electric propulsion system control device includes three airspeed measurement units. The three airspeed measurement units calculate airspeed vectors with respect to three different directions, respectively. The airspeed vectors with respect to the airframe, which include three-dimensional components, can be calculated by combining airspeed vectors with respect to the three different directions.

1. Configuration of Electric Propulsion System Control Device

Figure 11:
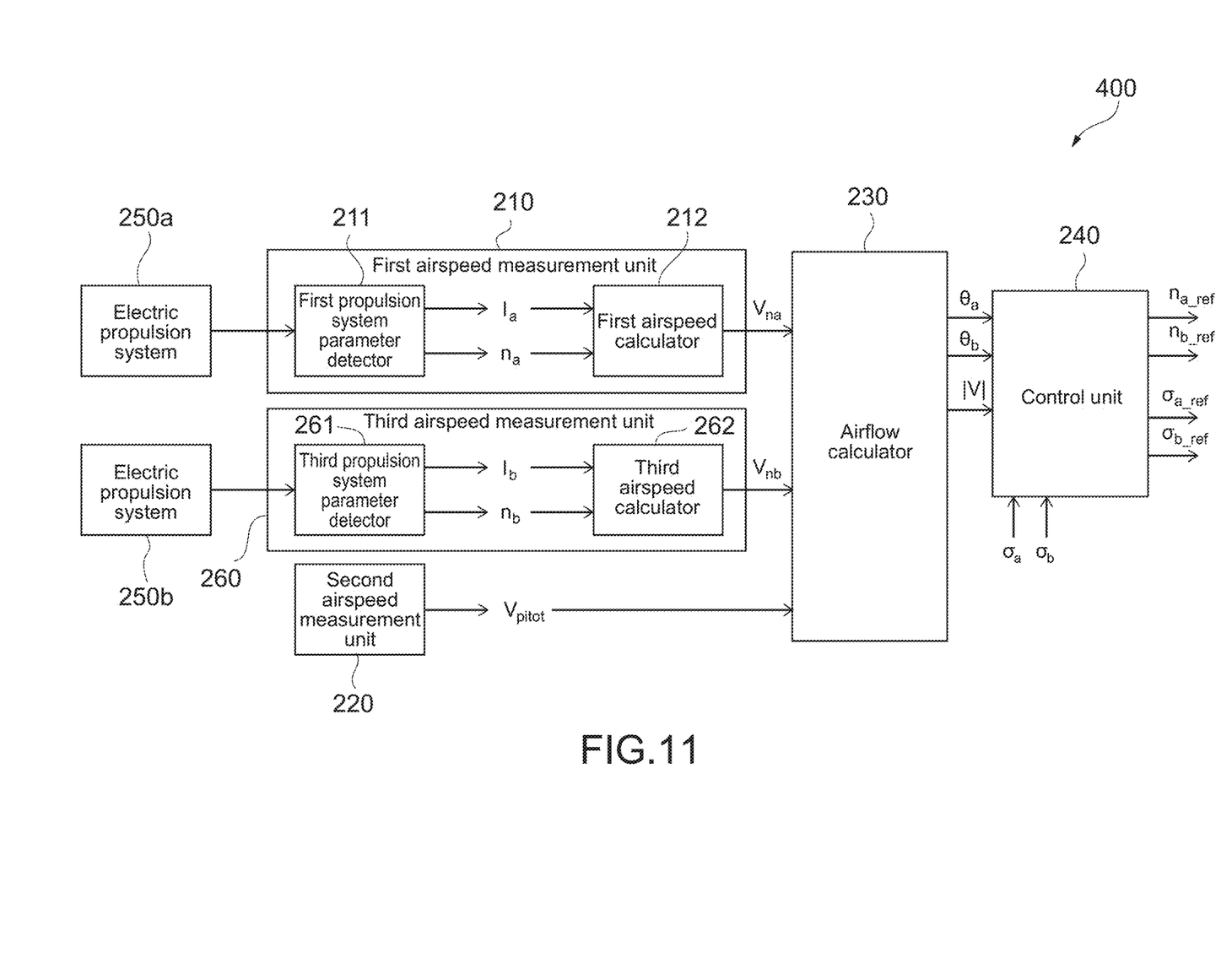
FIG. 11 A diagram showing a configuration of an electric propulsion system control device according to a third embodiment of the present invention.

FIG. 11 shows a configuration of an electric propulsion system control device according to a third embodiment of the present invention.

An electric propulsion system control device 400 is mounted on the motorized aircraft 100. The electric propulsion system control device 400 controls two electric propulsion systems 250a, 250b. The electric propulsion systems 250a, 250b each correspond to any one of the electric propulsion systems 104a, 104b, 104c, 104d (see FIG. 1). A propeller rotation axis direction (first direction) of the electric propulsion system 250a is different from a propeller rotation axis direction (third direction) of the electric propulsion system 250b.

The electric propulsion system control device 400 includes a first airspeed measurement unit 210, a second airspeed measurement unit 220, a third airspeed measurement unit 260, an airflow calculator 230, and a control unit 240.

The first airspeed measurement unit 210 includes a first propulsion system parameter detector 211 and a first airspeed calculator 212. The first propulsion system parameter detector 211 detects propulsion system parameters of the electric propulsion system 250a (i.e., current Ia supplied to the motor 202 and propeller number of revolutions na of the propeller 201 that are included in the electric propulsion system 250a). The first airspeed calculator 212 calculates first airspeed Vna with respect to the propeller rotation axis direction (first direction) of the electric propulsion system 250a on the basis of the propulsion system parameters (i.e., current Ia and propeller number of revolutions na) of the electric propulsion system 250a.

The second airspeed measurement unit 220 includes a velocity detector 208 and a pressure gauge 209 in FIG. 4. The second airspeed measurement unit 220 measures an airflow pressure p (dynamic pressure) by the use of the velocity detector 208 (pitot tube) and calculates airspeed Vpitot of the aircraft with respect to the tube axis direction of the pitot tube. A tube axis direction (second direction) of the pitot tube is different from the propeller rotation axis direction (first direction) of the electric propulsion system 250a and the propeller rotation axis direction (third direction) of the electric propulsion system 250b.

The third airspeed measurement unit 260 includes a third propulsion system parameter detector 261 and a third airspeed calculator 262. The third propulsion system parameter detector 261 detects propulsion system parameters of the electric propulsion system 250b (i.e., current I supplied to the motor 202b and propeller number of revolutions nb of the propeller 201 that are included in the electric propulsion system 250b). The third airspeed calculator 262 calculates third airspeed Vnb with respect to the propeller rotation axis direction (third direction) of the electric propulsion system 250b on the basis of the propulsion system parameters (i.e., current Ib and propeller number of revolutions nb) of the electric propulsion system 250b.

The airflow calculator 230 acquires the first airspeed Vna calculated by the first airspeed calculator 212, the second airspeed Vpitot measured by the second airspeed measurement unit 220, and the third airspeed Vnb measured by the third airspeed measurement unit 220. The airflow calculator 230 further acquires the direction (first direction) of the propeller rotation axis of the electric propulsion system 250a, the direction (second direction) that is the tube axis direction of the pitot tube, and the direction (third direction) of the propeller rotation axis of the electric propulsion system 250b.

The airflow calculator 230 combines the first airspeed vector Vna indicating the first airspeed with respect to the first direction, the second airspeed vector Vx indicating the second airspeed with respect to the second direction (tube axis direction of the pitot tube), and the third airspeed vector Vnb indicating the third airspeed with respect to the third direction. The airflow calculator 230 thus calculates an airspeed vector V acting on the aircraft. The airspeed vector V includes three-dimensional components. Specifically, the airflow calculator 230 calculates an airflow direction and airspeed of the airflow acting on the aircraft. In other words, the airflow calculator 230 calculates three-dimensional angles θa, θb of the airflow with respect to the datum line and magnitude |V| of the airspeed vector V.

The airflow calculator 230 may calculate the airspeed V and the three-dimensional airflow directions θa, θb on the basis of the propulsion system parameters at a point of time when the orientations (i.e., tilt angles σa, σb) of the propeller rotation axes of the electric propulsion systems 250a, 250b have been changed. Changing the orientations (tilt angles σa, σb) of the propeller rotation axes changes the lift generated by interaction between the angle of attack α, the thrust generated by the above-mentioned electric propulsion systems, and the wings, which can change the aircraft stability. It is thus necessary to control the attitude and the like of the airframe 101.

The control unit 240 calculates appropriate propeller number of revolutions na_ref, nb_ref of the electric propulsion systems 250a, 250b and outputs them to the electric propulsion systems 250a, 250b, respectively. Moreover, the control unit 240 controls the operational conditions of the electric propulsion systems constituted by the highly-responsive electric motors on the basis of the calculated changes in variables, so that the total thrust of the plurality of electric propulsion systems 104a, 104b, 104c, 104d or the aerodynamic force generated by the airframe 101 falls within a desired range.

Alternatively/additionally, the control unit 240 controls the attitude and flight path of the airframe 101 of the motorized aircraft 100 on the basis of the calculated changes in variables. For example, the control unit 240 calculates appropriate tilt angles σa_ref, σb_ref of the electric propulsion systems 250a, 250b and outputs them to the electric propulsion systems 250a, 250b for controlling the attitude of the airframe 101.

2. Brief Summary

According to the present embodiment, the airspeed and airflow direction including the three-dimensional components can be calculated based on the first direction and the first airspeed, the second direction and the second airspeed, and the third direction and the third airspeed. Accordingly, the airspeed vectors with respect to the airframe can be calculated more correctly. Moreover, horizontal and vertical winds can be rapidly detected without cost and weight disadvantages.

As a modified example, without the pitot tube, airspeed vectors in three different directions may be calculated based on propulsion system parameters of three electric propulsion systems having different propeller axial directions, the airspeed vectors in three different directions may be combined, and airspeed vectors including three-dimensional components may be calculated. The omission of the pitot tube allows faster calculation of the airspeed vector.

As a modified example (not shown), airspeed vectors in four or more different directions may be calculated based on the propulsion system parameters of four or more electric propulsion systems, airspeed vectors in the four or more different directions may be combined, and airspeed vectors including three-dimensional components may be calculated. This allows more optimal adjustment/control of the parameters of the four or more electric propulsion systems.

IV. Conclusion

As described above, according to each embodiment, the airspeed vector V (i.e., airspeed and airflow direction) of the airflow acting on the aircraft is calculated based on the airspeed vectors in the plurality of different directions. Moreover, the electric means calculates the airspeed on the basis of the propulsion system parameters (i.e., current and propeller number of revolutions). Therefore, horizontal and vertical winds can be detected rapidly without cost and weight disadvantages. Accordingly, rapidly detecting a change in airspeed vector V can keep the lift L and drag D depending on the airspeed vector V and the thrust F needed to change depending on the lift L and the drag D at appropriate values. This can keep the flight safely and efficiently.

Favorably, the electric propulsion system control device according to the present invention is applied to an aircraft. Alternatively, it may be applied to a watercraft or a wind power propulsion movable object on land. In addition, it may be applied to a configuration in which a wind turbine of a wind power generator for example corresponds to the propulsion propeller and the electric motor is normally used as an electric generator.

Although the embodiments and modified examples of the present technology have been described, the present technology is not limited thereto, and various modifications can be made without departing from the gist of the present technology as a matter of course.

REFERENCE SIGNS LIST 100 motorized aircraft
101 airframe
102 main wing
103 main wing
104a, 104b, 104c, 104d electric propulsion system
108 pitot tube
2 propeller number of revolutions
200, 300, 400 electric propulsion system control device 201 propeller
202 motor
203 inverter
204 power supply
205 voltage detector
206 controller
207 number of revolutions detector
208 velocity detector
209 pressure gauge
210 first airspeed measurement unit
211 first propulsion system parameter detector
212 first airspeed calculator
220 second, third airspeed measurement unit
230 airflow calculator
240 control unit
250, 250a, 250b electric propulsion system
260 second, third airspeed measurement unit
261 second, third propulsion system parameter detector
262 second, third airspeed calculator

The invention claimed is:

1. A motorized aircraft, comprising:
an airframe having a wing;
an electric propulsion system tiltably mounted on the airframe, driven by an electric motor, and configured to rotate a propeller or fan about a first rotation axis as a center:
 a first detector configured to detect a current supplied to the electric motor and a revolution speed of the electric propulsion system;
 a first airspeed calculator configured to calculate a first airspeed with respect to a first direction that is a direction of the first rotation axis on a basis of the current and the revolution speed;
 a second airspeed measurement unit mounted on the airframe including a pitot tube and configured to measure a second airspeed of the aircraft with respect to a second direction different from the first direction on a basis of pressure on the pitot tube, the pitot tube having a tube axis direction in the second direction or having holes opened in a plurality of directions including the second direction; and
 an airflow calculator configured to calculate airspeed and airflow direction with respect to the airframe on a basis of the first direction, the first airspeed, the second direction, and the second airspeed.

2. The motorized aircraft according to claim 1, wherein the airflow calculator corrects the airspeed and airflow direction by sequential estimation processing using the current and the revolution speed, which are detected by the first detector at a plurality of points of time.

3. The motorized aircraft according to claim 1, further comprising:
a third airspeed measurement unit that is mounted on the airframe and includes
 a second detector configured to detect a current and a revolution speed of another electric propulsion system, the other electric propulsion system configured to be driven by another electric motor and to rotate about a second rotation axis as a center, the second rotation axis extending in a third direction different from the first direction and the second direction, and
 a third airspeed calculator configured to calculate a third airspeed with respect to a rotation axis direction on a basis of the current and the revolution speed of the other electric propulsion system, the rotation axis direction being a direction of the second rotation axis,
wherein the airflow calculator calculates the airspeed and airflow direction including three-dimensional components on a basis of the first direction and the first airspeed, the second direction and the second airspeed, and the third direction and the third airspeed.

4. The motorized aircraft according to claim 1, further comprising a control unit that
calculates changes in variables regarding the current and the revolution speed, and
controls an attitude or flight path of the aircraft on a basis of the calculated changes in variables.

5. The motorized aircraft according to claim 1, wherein the first airspeed calculator is configured to calculate an advance ratio, and to calculate the first airspeed on a basis of the advance ratio.

6. The motorized aircraft according to claim 1,
wherein the motorized aircraft is capable of vertical landing by tilting the wing, and
wherein the electric propulsion system is mounted on the wing.

* * * * *